United States Patent
Logiodice

(10) Patent No.: US 9,527,270 B2
(45) Date of Patent: Dec. 27, 2016

(54) CYLINDER SYSTEM FOR TISSUE PAPER LAMINATION

(71) Applicant: ROLLTEC CILINDRO LTDA, Guarulhos (BR)

(72) Inventor: José Antonio Logiodice, São Paulo (BR)

( * ) Notice: Subject to any disclaimer, the term of this patent is extended or adjusted under 35 U.S.C. 154(b) by 0 days.

(21) Appl. No.: 14/132,701

(22) Filed: Dec. 18, 2013

(65) Prior Publication Data

US 2015/0165716 A1   Jun. 18, 2015

(51) Int. Cl.
| | |
|---|---|
| B31D 1/00 | (2006.01) |
| B32B 37/14 | (2006.01) |
| B32B 38/06 | (2006.01) |
| B31F 1/07 | (2006.01) |

(52) U.S. Cl.
CPC ............. *B32B 37/14* (2013.01); *B31F 1/07* (2013.01); *B32B 38/06* (2013.01); *B31F 2201/0717* (2013.01); *B31F 2201/0738* (2013.01); *B31F 2201/0743* (2013.01); *B31F 2201/0764* (2013.01); *B31F 2201/0766* (2013.01); *B31F 2201/0787* (2013.01); *Y10T 156/14* (2015.01)

(58) Field of Classification Search
CPC ...... B32B 38/06; B32B 38/0012; B32B 37/14; B31F 1/07; B31F 2201/0787; B31F 2201/0738; B31F 2201/0743; B31F 2201/0764; B31F 2201/0766; B31F 2201/0717
USPC .......................................... 156/443
See application file for complete search history.

(56) References Cited

U.S. PATENT DOCUMENTS 5,215,617 A * 6/1993 Grupe ........................... 156/209

* cited by examiner

*Primary Examiner* — Jacob T Minskey
*Assistant Examiner* — Vishal I Patel
(74) *Attorney, Agent, or Firm* — B. Aaron Schulman, Esq.; Stites & Harbison, PLLC.

(57) ABSTRACT

A cylinder system for tissue paper lamination comprising an embossing cylinder (22), which includes a combined DESL (1) and Point to Point (2) embossing, and for this purpose, higher elements (23) are provided for DESL process, and lower elements (24) for Point to Point process, such elements forming several relieves on paper surface and can compose figures, ribbing and all sorts of drawings.

1 Claim, 3 Drawing Sheets

CYLINDER SYSTEM FOR TISSUE PAPER LAMINATION

FIELD OF THE INVENTION

The present invention relates to technical and functional improvements in a cylinder that combines two types of lamination typically made exclusively with different rollers.

BACKGROUND OF THE INVENTION

As is well known, the tissue paper, due to its peculiar characteristics, is widely used in different products, especially toilet paper, paper towels and napkins paper; however, to enhance the quality of such products, they undergo by laminating process, which traditionally can vary according to the product to be obtained.

Although there are several lamination processes, two of them are highlighted and given different designations such as: DESL and Point to Point, whereas they are more suitable for the production of toilet paper, paper towels and napkins paper, or others with the same characteristics.

The Point to Point lamination process is carried out between two synchronized steel cylinders, with extremely accurate rollers having less than 0.01 mm of circularity and less than 0.005 mm of ovalization, which allow a large volume of semi-finished product as toilet paper and paper towel, due to the cells structure. A padded is created, but it gives a flat appearance to the laminated paper.

DESL laminating process is carried out in a calendering roll called Marrying roll. The cylinders elements are slotted, but synchronized so that the male elements (high-relief) fit into the female parts (low-relief). This system generates a smaller volume on paper than Point to Point system, but it provides a 3D appearance with the impression of a larger volume.

SUMMARY OF THE INVENTION

The present invention provides technical and functional improvements in a cylinder by combining two types of lamination process typically made exclusively with different rollers. The improvement solves the problems or drawbacks of merging these two outcomes features on paper, which are volume and 3D appearance. The precision of adjustments on engraved cylinder is ensured through innovative processes in the manufacture of cylinders, despite having higher elements for the simulation of DESL.

The innovation in the production process and timing adjustments of the cylinders allow innovative results in the field of tissue and paper converting. The combination of these two technologies has not yet been presented in the market or disclosed before.

DETAILED DESCRIPTION OF THE INVENTION

FIGS. 1A, 1B, 2A and 2B, includes two known technologies for embossing, one named DESL (1), and the other, Point to Point (2). The former technology provided to the paper a smaller volume than the Point to Point process, but provides a 3D appearance with the impression of a larger volume, while the latter provides a large volume of semi-finished product such as toilet paper and paper towels, due to cells structure.

Figure 1A:
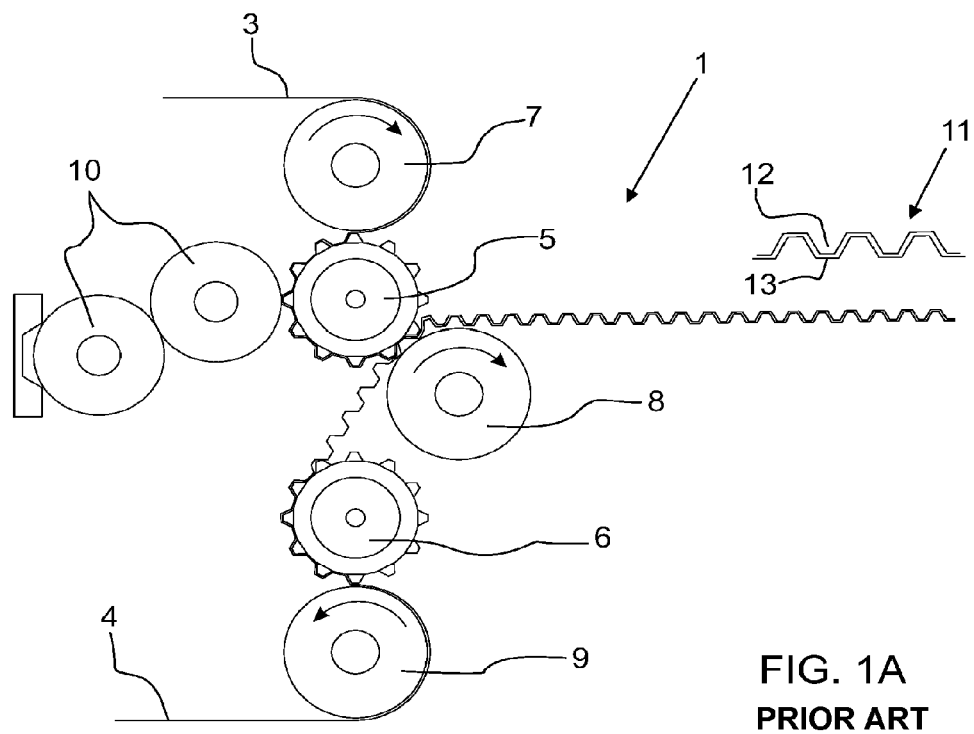
FIGS. 1A and 1B show schematic views highlighting the DESL tissue paper lamination process.
Figure 1B:
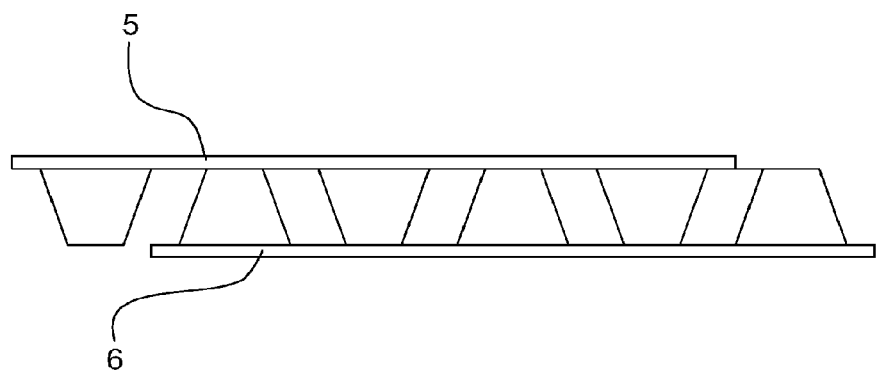

On FIGS. 1A and 1B it is schematically shown the DESL process (1), whereby it can be seen that the two paper layers (3 and 4) pass through their respective embossing cylinders (5 and 6), which jointly operate with calendering rolls (7, 8 and 9), and other sizing rolls (10) so that after the embossing of the paper layers (3 and 4), the same overlap to form a double overlying layer (11), defining a lamination which is held in a calendering roll (8) called Marrying roll. At this point, the elements of cylinders are slotted, but synchronized, where the male elements (high relief) (12) fit into female elements (low relief) (13), resulting in a smaller volume in double paper (11) when compared with the Point to Point process (2), but providing a 3D appearance, creating the impression of a larger volume.

Figure 2A:
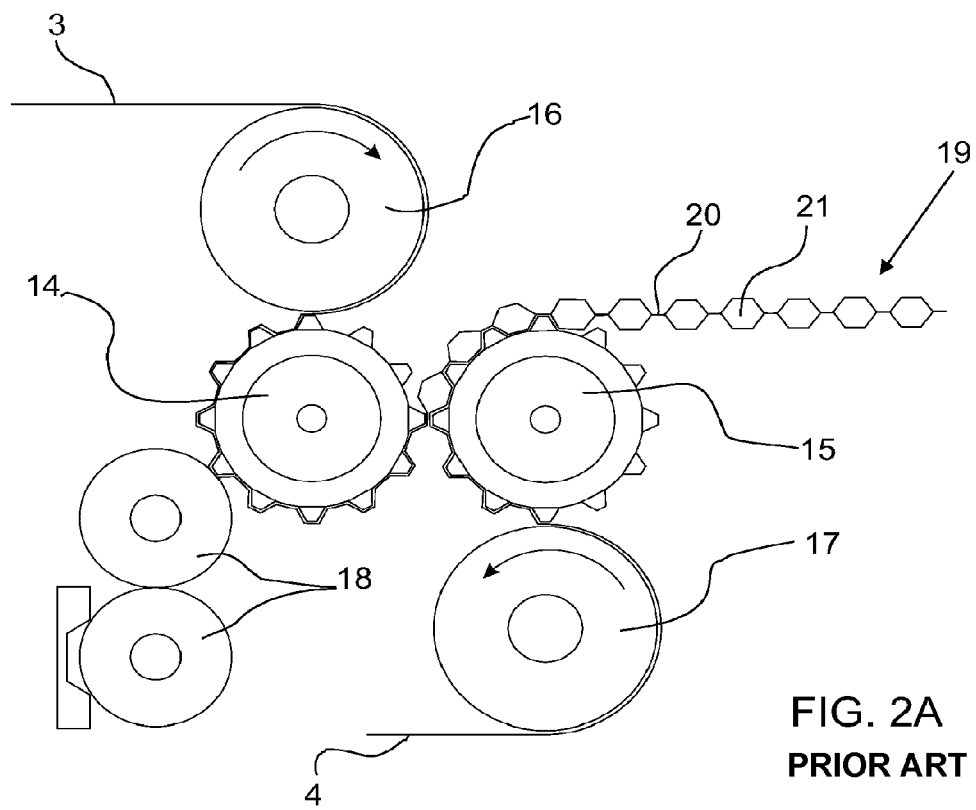
FIGS. 2A and 2B show schematic views highlighting the Point to Point tissue paper lamination process.
Figure 2B:
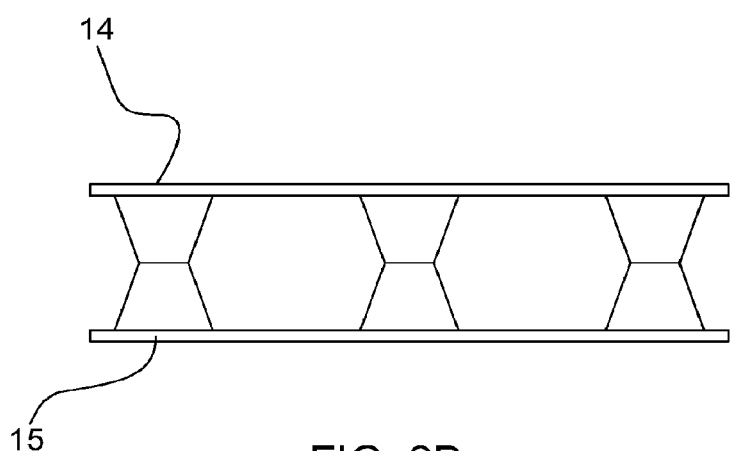

On FIGS. 2A and 2B it is schematically illustrated the Point to Point process (2), where the two paper layers (3 and 4) pass through their respective embossing cylinders (14 and 15), which operate in conjunction with calendering rolls (16, 17) and other sizing rollers (18). After the embossing of the paper layers (3 and 4), the same overlap to form a double overlying layer (19) where relieves of one paper and another have male elements glued on top (20) forming overlapped dots, while the female elements are combined to form a hollow portion (21), producing a padded effect, but giving a flat appearance to double-laminated paper.

Therefore, the Point to Point process is a lamination between two synchronized steel cylinders (14 and 15), both extremely accurate having less than 0.01 mm of circularity and less of 0.005 mm of ovalization, which allow a large volume of semi-finished product as toilet paper and paper towels, due to cells structure. Creating a padded, but with a flat appearance to the laminated paper.

Figure 3:
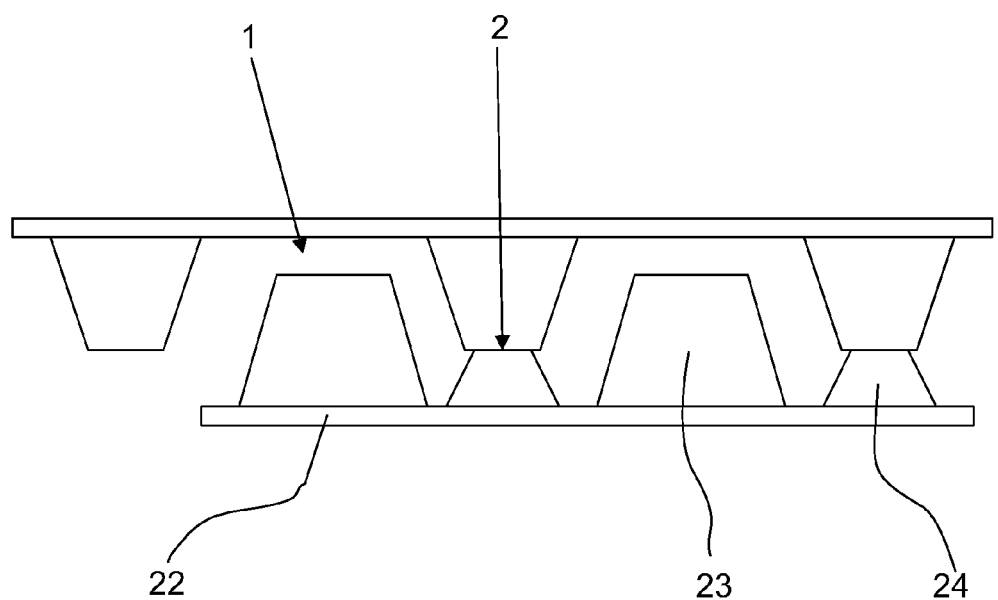
FIG. 3 illustrates a schematic view of the cylinders according to the invention that simultaneously combine the two processes.

As illustrated on FIG. 3, the present invention comprises an embossing cylinder (22) which includes a combined DESL (1) and Point to Point (2) embossing process. For this purpose, higher elements (23) are provided to DESL process and lower elements (24) for Point to Point process, such elements forming various relieves on paper surface and can compose figures, ribbing and all sorts of drawings.

The combination of both systems into a cylinder (22) definitely solves the problems or drawbacks of combining these two outcomes features in paper, such as volume and 3D appearance. The precision of adjustments on engraved cylinder is ensured through innovative processes in the manufacture of cylinders, even having higher elements for simulating DESL process.

It will be understood that certain characteristics and combinations of embossing rollers and cylinders, as well as the sizing systems, may considerably vary while maintaining the same functional concept for the assembly. Consequently, we note that the embodiment herein described in detail by way of example is clearly open to constructive variations, but always within the scope of the inventive concept herein described of an embossing cylinder (22), which includes combined DESL (1) and Point to Point (2) lamination process, and as many modifications can be made on herein detailed configuration according to the descriptive requirements of the law, it is understood that the present details should be interpreted in an illustrative and not limiting manner.

The invention claimed is:

1. A cylinder system for tissue paper lamination comprising:
- an embossing cylinder having higher elements provided for DESL process and lower elements provided for Point to Point process;
- wherein the upper surface of the lower elements is situated above the upper surface of the embossing cylinder, but below the upper surface of the higher elements;
- wherein the DESL is applied on a top paper sheet and the Point to Point applied to a bottom paper sheet, wherein a bonding of the top paper sheet and the bottom paper sheet through an adhesive occurs only in a touch point between the two sheets at the Point to Point process location, within the lower elements, and
- wherein the combination of the higher elements provided for DESL and the lower elements provided for Point to Point process enables for the tissue paper having an aggregate simultaneous result merging a maximized embossing volume and diameter and with a maximized 3D visual appearance.

* * * * *